United States Patent

Meixner et al.

[11] Patent Number: 5,300,615
[45] Date of Patent: Apr. 5, 1994

[54] POLYURETHANES CONTAINING ACRYLOYL GROUPS, A PROCESS FOR THEIR PREPARATION AND THEIR USE AS BINDERS FOR COATING COMPOSITIONS

[75] Inventors: Jürgen Meixner, Krefeld; Wolfgang Fischer, Meerbusch, both of Fed. Rep. of Germany

[73] Assignee: Bayer Aktiengesellschaft, Leverkusen, Fed. Rep. of Germany

[21] Appl. No.: 123,630

[22] Filed: Sep. 20, 1993

[30] Foreign Application Priority Data

Sep. 24, 1992 [DE] Fed. Rep. of Germany ....... 4232013

[51] Int. Cl.$^5$ .............. C08G 18/68; C08G 18/73; C08F 2/46; C08J 3/28
[52] U.S. Cl. .............................. 528/49; 528/67; 528/75; 528/76; 528/80; 528/85; 522/90; 522/97; 522/173; 522/178
[58] Field of Search .................. 528/49, 67, 75, 76, 528/80, 85; 522/90, 97, 173, 178

[56] References Cited

U.S. PATENT DOCUMENTS

| | | | |
|---|---|---|---|
| 3,782,961 | 1/1974 | Takahashi et al. | 96/115 R |
| 4,225,695 | 9/1980 | Schuster et al. | 528/75 |
| 5,128,432 | 7/1992 | Meixner et al. | 528/49 |
| 5,136,008 | 8/1992 | Meixner et al. | 528/49 |
| 5,136,009 | 8/1992 | Meixner et al. | 528/49 |
| 5,247,048 | 9/1993 | Meixner et al. | 528/49 |

FOREIGN PATENT DOCUMENTS 1159551 7/1969 United Kingdom .
1159552 7/1969 United Kingdom .

Primary Examiner—Maurice J. Welsh
Assistant Examiner—Rabon Sergent
Attorney, Agent, or Firm—Joseph C. Gil; Thomas W. Roy

[57] ABSTRACT

The present invention relates to polyurethanes which contain acryloyl groups, have a viscosity at 23° C. of 800 to 100,000 mPa.s, and are prepared by reacting at an NCO/OH equivalent ratio of 0.7:1 to 1:1, I) an organic isocyanate component containing
   a) 20 to 50 mole % of one or more organic diisocyanates, other than hexamethylene diisocyanate, which have aliphatically and/or cycloaliphatically bound isocyanate groups and a molecular weight of less than 300 and
   b) 50 to 80 mole % of hexamethylene diisocyanate with II) a hydroxyl component containing
   c) 43 to 93 hydroxyl equivalent % of an alcohol component which has an average hydroxyl functionality of 0.8 to 1.5 and contains one or more alcohols having acryloyl groups and a molecular weight of 116 to 1000, provided that at least 50 mole % of component c) is made up of ether group-containing esterification products of acrylic acid with ether group-containing alcohols which are at least trihydric, wherein the esterification products have an average molecular weight of 300 to 1000 and an average hydroxyl functionality of 0.8 to 1.5,
   d) 7 to 50 hydroxyl equivalent % of one or more monohydric or dihydric branched alcohols having a molecular weight of 130 to 300 and
   e) 0 to 50 hydroxyl equivalent % of one or more monohydric or polyhydric alcohols having a molecular weight of less than 130.

The present invention also relates to a method of preparing these polyurethanes and to their use as binders for coating compositions, particularly for those which can be hardened by high-energy radiation.

4 Claims, No Drawings

POLYURETHANES CONTAINING ACRYLOYL GROUPS, A PROCESS FOR THEIR PREPARATION AND THEIR USE AS BINDERS FOR COATING COMPOSITIONS

BACKGROUND OF THE INVENTION

1. Field of the Invention

The present invention relates to low-viscosity polyurethanes containing acryloyl groups, which may be converted into cross-linked products by radiation hardening. The invention also relates to a method for their preparation and to their use as binders for coating compositions.

2. Description of the Prior Art

Polyurethanes which contain acryloyl groups are known and may be obtained inter alia as the products of the reaction of polyisocyanates and hydroxyalkyl acrylates as described in DE-OS 1,644,798, DE-OS 2,115,373 or DE-OS 2,737,406. They are hardened by means of high-energy radiation such as UV or electron beams and may be employed for coating wood or for the production of coatings for graphics purposes.

A wide range of different polyisocyanates may be used to prepare urethane acrylates. If the primary interest is the production of lacquer films which are resistant to yellowing, (cyclo)aliphatic polyisocyanates are employed for the preparation of the urethane acrylates. Although hexamethylene diisocyanate is also mentioned among other materials in DE-OS 2,115,373 as being a suitable diisocyanate starting material, this diisocyanate cannot be used in the formulations described in this prior publication due to the crystallinity of the urethane acrylates produced, which render them unsuitable for use as a lacquer vehicle.

DE-OS 4,027,743 describes urethane acrylates based on hexamethylene diisocyanate and modified with ester alcohols, and which after their preparation are liquid at room temperature. However, these products, which are of high to medium viscosity, become turbid at temperatures less than 10° C.

An object of the present invention is to provide low viscosity, aliphatic polyurethanes containing acryloyl groups, which are prepared from hexamethylene diisocyanate (HDI) and which are liquid at temperatures of less than 10° C. without additional solvent having to be employed.

This object may be achieved with the aliphatic polyurethanes containing acryloyl groups according to the invention and their method of preparation, which are described in detail hereinafter.

SUMMARY OF THE INVENTION

The present invention relates to polyurethanes which contain acryloyl groups, have a viscosity at 23° C. of 800 to 100,000 mPa.s, and are prepared by reacting at an NCO/OH equivalent ratio of 0.7:1 to 1:1,
an organic isocyanate component containing
a) 20 to 50 mole % of one or more organic diisocyanates, other than hexamethylene diisocyanate, which have aliphatically and/or cycloaliphatically bound isocyanate groups and a molecular weight of less than 300 and
b) 50 to 80 mole % of hexamethylene diisocyanate with
II) a hydroxyl component containing
c) 43 to 93 hydroxyl equivalent % of an alcohol component which has an average hydroxyl functionality of 0.8 to 1.5 and contains one or more alcohols having acryloyl groups and a molecular weight of 116 to 1000, provided that at least 50 mole % of component c) is made up of ether group-containing esterification products of acrylic acid with ether group-containing alcohols which are at least trihydric, wherein the esterification products have an average molecular weight of 300 to 1000 and an average hydroxyl functionality of 0.8 to 1.5,
d) 7 to 50 hydroxyl equivalent % of one or more monohydric or dihydric branched alcohols having a molecular weight of 130 to 300 and
e) 0 to 50 hydroxyl equivalent % of one or more monohydric or polyhydric alcohols having a molecular weight of less than 130.

The present invention also relates to a method of preparing these polyurethanes containing these acryloyl groups by reacting the above starting materials a) to e) at an NCO/OH equivalent ratio of 0.7:1 to 1:1.

The present invention further relates to the use of these polyurethanes containing acryloyl groups as binders for coating compositions, particularly for those which can be hardened by high-energy radiation.

DETAILED DESCRIPTION OF THE INVENTION

The isocyanate component used according to the invention contains 20 to 50 mole %, preferably 30 to 50 mole %, of diisocyanates a), and 50 to 80 mole %, preferably 50 to 70 mole %, of hexamethylene diisocyanate, based on the total moles of the isocyanate component.

Diisocyanates a) have with aliphatically and/or cycloaliphatically bound isocyanate groups and a molecular weight of less than 300. Suitable diisocyanates include 1-isocyanato-3,3,5-trimethyl-5-isocyanatomethyl-cyclohexane (IPDI), 1,6-diisocyanato-2,2,4-trimethyl-hexane, 1,4-diisocyanatocyclohexane, 1-methyl-1-isocyanato-3-(4)-isocyanatomethylcyclohexane and mixtures thereof.

The hydroxyl component contains 43 to 93 hydroxyl equivalent %, preferably 70 to 90 hydroxyl equivalent %, of alcohol component c); 7 to 50 hydroxyl equivalent %, preferably 10 to 30 hydroxyl equivalent %, of branched alcohol d); and 0 to 50 hydroxyl equivalent %, preferably 0 to 35 hydroxyl equivalent %, of alcohol component e). The total amount of diisocyanates a) and b) and the total amount of alcohols c) to e) correspond to the previously mentioned NCO/OH equivalent ratio.

Alcohol component c) has an average hydroxyl functionality of 0.8 to 1.5 and contains one or more alcohols containing acryloyl groups and having a molecular weight of 116 to 1000, provided that at least 50 mole % of alcohol component c) is selected from ether group-containing esterification products of acrylic acid with ether group-containing alcohols which are at least trihydric, wherein the esterification products have an average molecular weight of 300 to 1000 and an average hydroxyl functionality of 0.8 to 1.5.

The alcohols, which contain acryloyl groups and do not correspond to the last-mentioned definition, are optionally present in an amount of up to 50 mole % based on the total amount of component c). These alcohols preferably have a molecular weight of 116 to 144 and contain one hydroxyl group per molecule. Examples include hydroxyethyl acrylate, the addition product formed by adding 1 mole of propylene oxide to 1 mole of acrylic acid (a mixture of 1-methyl-2-hydroxyethyl acrylate and 2-hydroxypropyl acrylate), 3-hydroxypropyl acrylate, 2-, 3- and 4-hydroxypropyl acrylate and mixtures thereof.

The esterification products containing acryloyl and ether groups which are present in an amount of at least 50 mole %, based on the total moles of component c), include esterification products of acrylic acid with alkoxylation products of polyhydric alcohols which contain at least one ether bridge per molecule. The alkoxylation products include addition products of propylene oxide and/or ethylene oxide, preferably those formed by adding ethylene oxide to alcohols which are at least trihydric, preferably trimethylol propane, glycerine and/or pentaerythritol. The most preferred alkoxylation products are the ethoxylation products of trimethylolpropane or glycerine, particularly the addition products formed by adding 4 to 12 moles of ethylene oxide to 1 mole of trimethylolpropane. The starting components for the preparation of the esterification products of acrylic acid are used at a ratio of carboxyl group equivalents to hydroxyl group equivalents of 1.5:3 to 2.2:3, preferably 2:3.

Component d) is selected from monohydric or dihydric, branched alcohols which have a molecular weight of 130 to 300, preferably from 130 to 200, and optionally contain ether and/or ester groups. Examples include 2,2-diethyl-1,3-propanediol, 2-ethyl-1,3-hexanediol, 2,5-dimethyl-2,5-hexanediol, 2,2,4-trimethyl-1,3-pentanediol, and the reaction product formed from 1 mole of trimethylolpropane and 1 mole of formaldehyde (trimethylolpropane methylol).

Component e) is preferably selected from monohydric to dihydric alcohols which have 2 to 8 carbon atoms and a molecular weight of less than 130. Examples include ethanol, benzyl alcohol, ethylene glycol, propane-1,2-diol, butane-1,3-diol, butane-1,3-diol, butane-1,4-diol and hexane-1,6-diol.

The preparation of the polyurethanes may be conducted in the absence of solvents or in solvents which are inert to isocyanates, such as acetone, ethyl acetate, butyl acetate, low molecular weight esters of (meth)acrylic acids and mixtures of these solvents. All reaction stages are conducted at temperatures of 20° to 100° C., preferably 40° to 80° C.

As indicated above, starting components a) to e), and also the individual constituents of components a), b), c), d) and/or e), may be reacted with each other in any desired sequence when the preparation according to the invention is carried out. Thus, it is possible to provide a mixture of components a) and b) and to add components c) to e) individually or as a mixture, or to provide components c) to e) and to add components a) and b) individually or as a mixture.

In a particularly preferred method component a) is introduced into a suitable reaction vessel, followed by reaction with an amount of component c) such that an NCO/OH equivalent ratio of 1:0.4 to 1:0.6, preferably 1:0.5, results. After the addition reaction, which occurs spontaneously on the addition of component c), has proceeded substantially to completion, component b) is introduced. Thereafter, in succession or as a mixture, the remainder of component c), component d) and optionally component e) are introduced and allowed to react. When employing this method, if component c) is based on a mixture of different alcohols, the first amount added may be a portion of the mixture or one of the alcohols. Likewise, the second amount added may be another portion of the mixture or another one of the alcohols).

The reactions are preferably conducted in the presence of suitable catalysts, e.g., tin(II) octoate, dibutyltin laurate or tertiary amines such as dimethylbenzylamine.

Products with an NCO content of less than 0.1 weight % are formed.

The resulting urethane acrylate may be protected from premature and undesirable polymerization by the addition of suitable inhibitors and antioxidants such as phenols and/or hydroquinones, in amounts of 0.001 to 0.3 weight % in each case, based on the weight of the urethane acrylate. A preferred inhibitor is phenothiazine. These additives may be added before, during and/or after carrying out the process according to the invention.

The coating compositions containing the products according to the invention may also contain the known additives used in such compositions. Suitable additives include fillers, pigments, colorants, thixotropic agents, glossing agents, matting agents and levelling agents, which may be added in the usual amounts.

The polyurethanes containing acryloyl groups may be dissolved in known lacquer solvents, admixed with copolymerizable monomers, or emulsified in water. However, they are preferably used without these auxiliary process materials to achieve the objects of the invention. Suitable solvents include butyl acetate, cyclohexane, acetone, toluene and mixtures thereof.

Examples of copolymerizable monomers comprise organic compounds which have at least one copolymerizable olefinic double bond per molecule and which have a maximum viscosity of 500 mPa.s at 23° C. Examples include styrene, 1,6-hexanediol diacrylate, trimethylolpropane triacrylate and N-vinyl pyrrolidone.

The inert solvents and the copolymerizable monomers may each be added in amounts of up to 100 weight %, preferably up to 50 weight %, based on the weight of the polyurethanes which contain acryloyl groups. It is possible to employ both inert solvents and copolymerizable monomers.

If the polyurethanes which contain acryloyl groups are to be used in the form of an aqueous emulsion, the corresponding aqueous emulsions may be produced by means of external emulsifying agents and optionally by the use of additives which are usually employed in emulsion technology. Emulsifying agents suitable for this purpose are known and described, for example, in Ullmanns Encyclophädie der technischen Chemie, Volume 10, 4th Edition, Chapter on emulsions, page 449 et seq.

In all embodiments of the invention, hardening is effected by means of high-energy radiation such as UV light, electron beam irradiation or gamma rays.

In the case of cross-linking by means of UV irradiation it is necessary to add photoinitiators to the coating materials. Suitable photoinitiators are known and include those described in Houben-Weil, Methoden der organischen Chemie, Volume E 20, page 80 et seq., Georg Thieme Verlag, Stuttgart 1987, for example.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropane-1-one.

The photoinitiators may be added in amounts, depending upon the application, of 0.1 to 10 weight %, preferably 0.1 to 5 weight %, based on the weight of the products according to the invention. The photoinitiators may be added individually or may be used in combination with one another to obtain advantageous synergistic affects.

The coating compositions or lacquers which contain the products according to the invention are suitable for coating a wide range of substrates, such as paper, cardboard, leather, wood, plastics, non-woven and woven fabrics, ceramic materials, mineral materials, glass, metal, imitation leather, and photographic materials such as paper provided with photographic film.

The following examples serve to describe the invention in more detail. All parts and percentages are by weight unless otherwise indicated.

EXAMPLES

Examples 1 to 7

(Examples According to the Invention)

The amount of component a) set forth in Table 1 was heated to 50° C. together with 0.02% dibutyltin laurate and 0.01% phenothiazine, while air was passed through the mixture. The amount of part 1 of component c) set forth in Table 1 was then added dropwise with stirring, and a maximum reaction temperature of 60° C. was maintained by cooling until the formation of the reaction products from a) and part 1 of c) was substantially complete, as detected by the decay of the heat of reaction. The amount of component b) set forth in Table 1 was then added, and the remainder of component c) and components d) and e), in the amounts set forth in Table 1, were successively added to the mixture dropwise with stirring. A maximum reaction temperature of 60° C. was maintained by cooling. After the heat of reaction had dissipated, the reaction was allowed to proceed further at 60° C. until the NCO content of the reaction mixture had fallen to less than 0.1%.

Examples 8 and 9

(Comparative Examples)

Comparative examples 8 and 9, which are also summarized in the Table below, were performed analogously to Examples 1 to 7 according to the invention. These comparative examples demonstrate that that the omission of components a) or d) resulted in the formation of crystalline final products.

|  | Examples ||||||| Comparative Examples ||
|---|---|---|---|---|---|---|---|---|---|
|  | 1 | 2 | 3 | 4 | 5 | 6 | 7 | 8 | 9 |
| Amount added (moles) | | | | | | | | | |
| Component a) | | | | | | | | | |
| Isophorone diisocyanate | 0.3 | 0.3 | 0.5 | 0.3 | 0.3 | 0.3 | 0.3 | — | 0.3 |
| Component c, part 1 | | | | | | | | | |
| Hydroxyethyl acrylate | 0.3 | — | — | — | 0.3 | — | 0.3 | — | 0.3 |
| Tetra-ethoxylated tri-methylolpropane diacrylate | — | — | — | — | — | 0.3 | — | — | — |
| Dodeca-ethoxylated tri-methylolpropane diacrylate | — | 0.3 | 0.5 | 0.3 | — | — | — | — | — |
| Component b) | | | | | | | | | |
| Hexamethylene diisocyanate | 0.7 | 0.7 | 0.5 | 0.7 | 0.7 | 0.7 | 0.7 | 1.0 | 0.7 |
| Component c), part 2 | | | | | | | | | |
| Hydroxyethyl acrylate | 0.5 | — | — | — | 0.5 | — | 0.5 | 0.8 | 0.5 |
| Tetra-ethoxylated tri-methylolpropane diacrylate | — | — | — | — | 0.8 | 1.5 | — | — | — |
| Dodeca-ethoxylated tri-methylolpropane diacrylate | 0.8 | 1.5 | 0.5 | 0.7 | — | — | 1.0 | 0.8 | 1.2 |
| Component d) | | | | | | | | | |
| 2-ethyl-1,3-hexanediol | 0.2 | — | 0.25 | 0.5 | 0.2 | — | — | 0.2 | — |
| Trimethylolpropanemethylal | — | 0.2 | — | — | — | 0.2 | — | — | — |
| 2,2,4-trimethylpentane-1,3-diol | — | — | — | — | — | — | 0.2 | — | — |
| Component e) | | | | | | | | | |
| Propane-1,2-diol | — | — | 0.25 | — | — | — | — | — | — |
| Viscosity (23° C./mPa · s) | 6000 | 3400 | 32000 | 25000 | 32000 | 50000 | 3500 | cryst. | cryst. |

EXAMPLES OF USE

The products from Examples 1 to 7 according to the invention were each mixed with 5% of 1-phenyl-2-hydroxy-2-methylpropane-1-one. After application of the coating compositions to cardboard (thickness of application = 15 μm), they were passed under a Hanovia irradiation lamp (80 W/cm, 10 cm distance). Scratch-resistant, solvent-resistant coatings were produced at belt speeds of at least 30 m/minute. "Solvent-resistant" means that the coating was not affected after at least 30 double rubs with a cloth saturated with butyl acetate under a load of 1 kg.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane which contains acryloyl groups, has a viscosity at 23°°C. of 800 to 100,000 mPa.s, and is prepared by reacting at an NCO/OH equivalent ratio of 0.7:1 to 1:1,
   I) an organic isocyanate component comprising
      a) 20 to 50 mole % of one or more organic diisocyanates, other than hexamethylene diisocyanate, which have aliphatically and/or cycloaliphatically bound isocyanate groups and a molecular weight of less than 300 and b) 50 to 80 mole % of hexamethylene diisocyanate with II) a hydroxyl component comprising c) 43 to 93 hydroxyl equivalent % of an alcohol component which has an average hydroxyl functionality of 0.8 to 1.5 and contains one or more alcohols having acryloyl groups and a molecular weight of 116 to 1000, provided that at least 50 mole % of component c) is made up of ether group-containing esterification products of acrylic acid with ether group-containing alcohols which are at least trihydric, wherein the esterification products have an average molecular weight of 300 to 1000 and an average hydroxyl functionality of 0.8 to 1.5, d) 7 to 50 hydroxyl equivalent % of one or more monohydric or dihydric branched alcohols having a molecular weight of 130 to 300 and e) 0 to 50 hydroxyl equivalent % of one or more monohydric or polyhydric alcohols having a molecular weight of less than 130.

2. A process for preparing a polyurethane containing acryloyl groups and having a viscosity at 23° C. of 800 to 100,000 mPa.s, which comprises reacting at an NCO/OH equivalent ratio of 0.7:1 to 1:1, I) an organic isocyanate component comprising a) 20 to 50 mole % of one or more organic diisocyanates, other than hexamethylene diisocyanate, which have aliphatically and/or cycloaliphatically bound isocyanate groups and a molecular weight of less than 300 and b) 50 to 80 mole % of hexamethylene diisocyanate with II) a hydroxyl component comprising c) 43 to 93 hydroxyl equivalent % of an alcohol component which has an average hydroxyl functionality 0.8 to 1.5 and contains one or more alcohols having acryloyl groups and a molecular weight of 116 to 1000, provided that at least 50 mole % of component c) is made up of ether group-containing esterification products of acrylic acid with ether group-containing alcohols which are at least trihydric, wherein the esterification products have an average molecular weight of 300 to 1000 and an average hydroxyl functionality of 0.8 to 1.5, d) 7 to 50 hydroxyl equivalent % of one or more monohydric or dihydric branched alcohols having a molecular weight of 130 to 300 and e) 0 to 50 hydroxyl equivalent % of one or more monohydric or polyhydric alcohols having a molecular weight of less than 130.

3. The process of claim 2 which comprises

A) introducing component a) into a reaction vessel,

B) then adding at least a portion of component c) while maintaining an NCO/OH equivalent ratio of 1:0.4 to 1:0.6, C) subsequently adding component b) and D) finally adding, in succession or as a mixture, the remainder of component c), component d) and optionally component e) and allowing the isocyanate addition reaction to proceed to completion.

4. A coating composition comprising a binder wherein the binder comprises the polyurethane of claim 1.

* * * * *